United States Patent [19]
Forshee

[11] 4,081,374
[45] Mar. 28, 1978

[54] BALANCE CONTROL WATER SCREEN

[76] Inventor: Edward Forshee, 3171-309 Rd., Grand Valley, Colo. 81635

[21] Appl. No.: 837,545

[22] Filed: Sep. 28, 1977

[51] Int. Cl.² ............................................. B01D 29/42
[52] U.S. Cl. ..................................... 210/116; 210/162
[58] Field of Search ........................ 210/116, 162, 418

[56] References Cited

U.S. PATENT DOCUMENTS

| | | | |
|---|---|---|---|
| 944,907 | 12/1909 | Powers | 210/156 |
| 1,493,405 | 5/1924 | Tuckfield | 210/156 |
| 1,551,967 | 9/1925 | Nample | 210/122 |
| 1,658,875 | 2/1928 | Arnold | 210/156 |
| 1,999,637 | 4/1935 | Pettenher | 210/156 |
| 2,309,472 | 1/1943 | Morton | 210/156 |
| 2,936,074 | 5/1970 | Forshee | 210/162 X |
| 3,355,022 | 11/1967 | Nordezz | 210/162 |

*Primary Examiner*—John Adee
*Attorney, Agent, or Firm*—Victor J. Evans & Co.

[57] ABSTRACT

Disclosed herein is an improved balance control water screen wherein the linkage associated with the balanced waste door is contained within the walled trough structure so as to provide a minimum number of linkage elements. Further improvements relate to a single walled construction and a simplified water sealing arrangement so that the water control screen is more efficient and economical.

1 Claim, 4 Drawing Figures

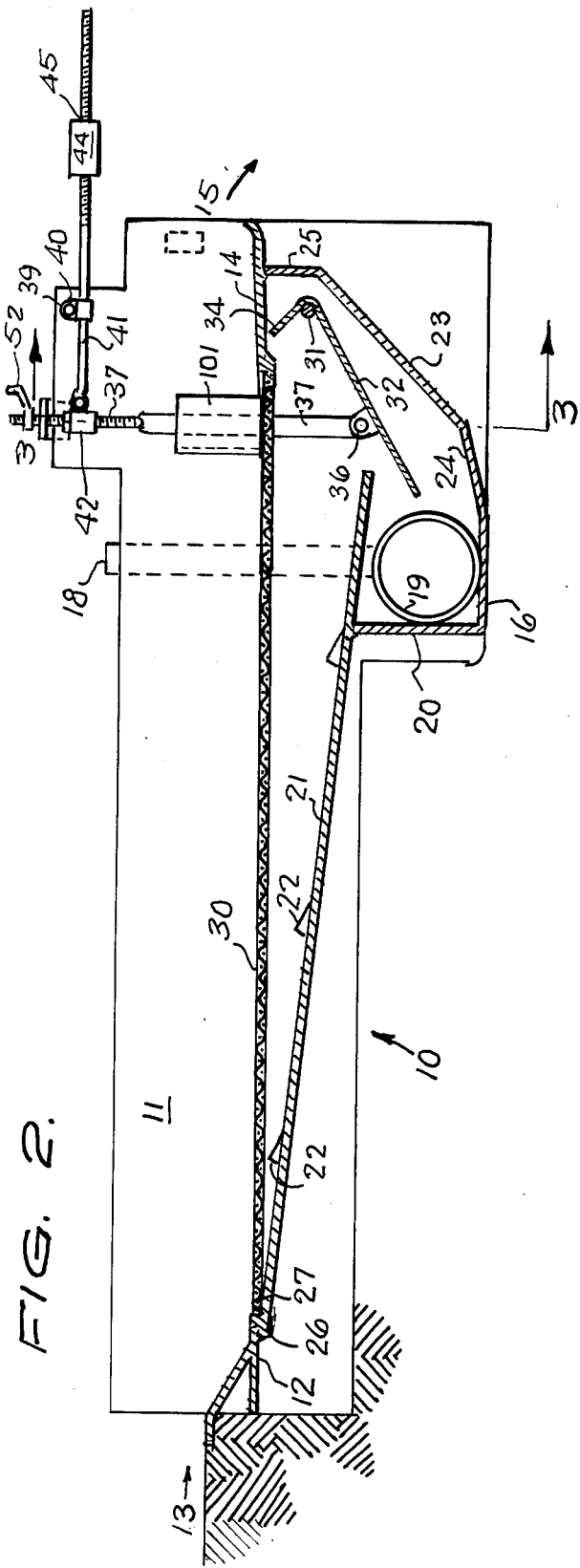
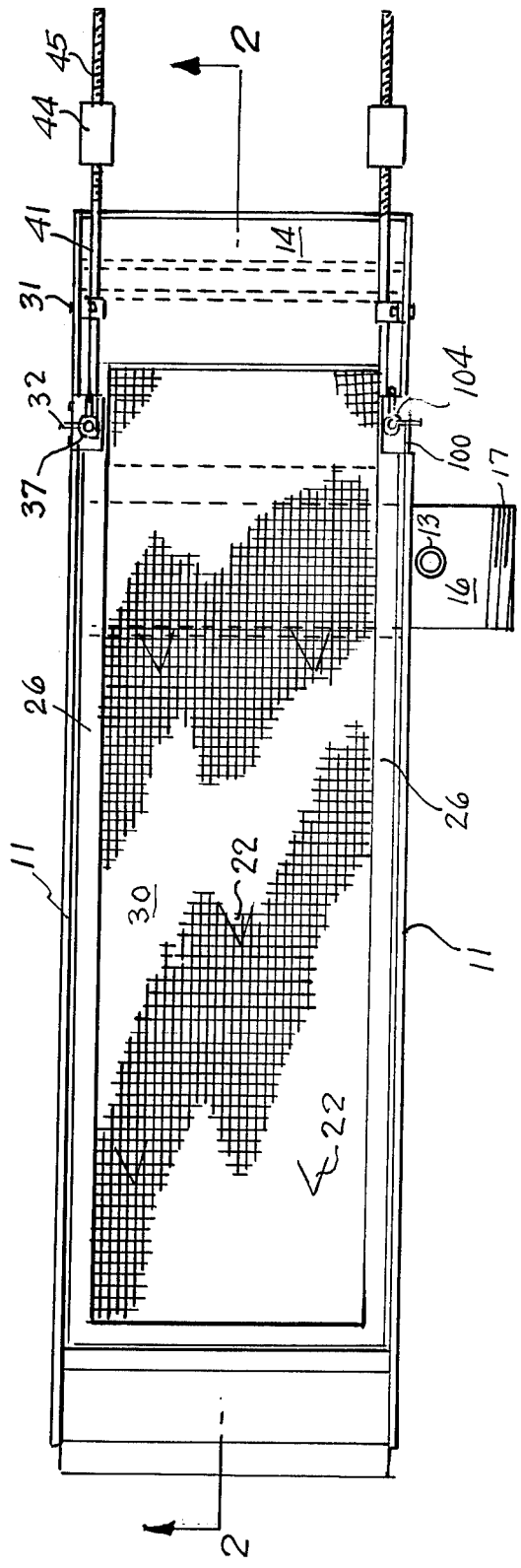
FIG. 2.
FIG. 1.

BALANCE CONTROL WATER SCREEN

BACKGROUND OF THE INVENTION

FIELD OF THE INVENTION

This invention relates to an improvement in my patented apparatus for use in separating trash or debris from fluid such as water.

The U.S. Pat. No. is 2,936,074 and the object of that invention was to provide an apparatus which includes a means for conveniently and readily separating foreign matter or trash from a fluid such as water so that clean, filtered water can pass or be directed to a desired location, and wherein the trash or other foreign matter removed from the water can be conveyed to a separate location.

Another object of that invention was to provide a fluid filtration system wherein foreign matter or trash was automatically separated from the water so that clean water could be supplied or provided, as for example when the water is to be used for irrigation purposes.

A further object of that invention was to provide a balance control water screen apparatus which is extremely simple and inexpensive to manufacture.

An object of this invention is to provide a simplification of that structure by eliminating its double walled construction thereby reducing the manufacturing costs and allowing the new improved wall to be made of thinner stock.

Another object of this invention is to provide a flange handle device to improve the operation of the door flap, and provide the flap itself with an improved bearing system.

Other objects and advantages will be apparent during the course of the following description.

BRIEF DESCRIPTION OF THE DRAWINGS

FIG. 1 is a plan view of the present invention;

FIG. 2 is a sectional view taken on the line 2—2 of FIG. 1;

DESCRIPTION OF THE PREFERRED EMBODIMENT

Figure 3:
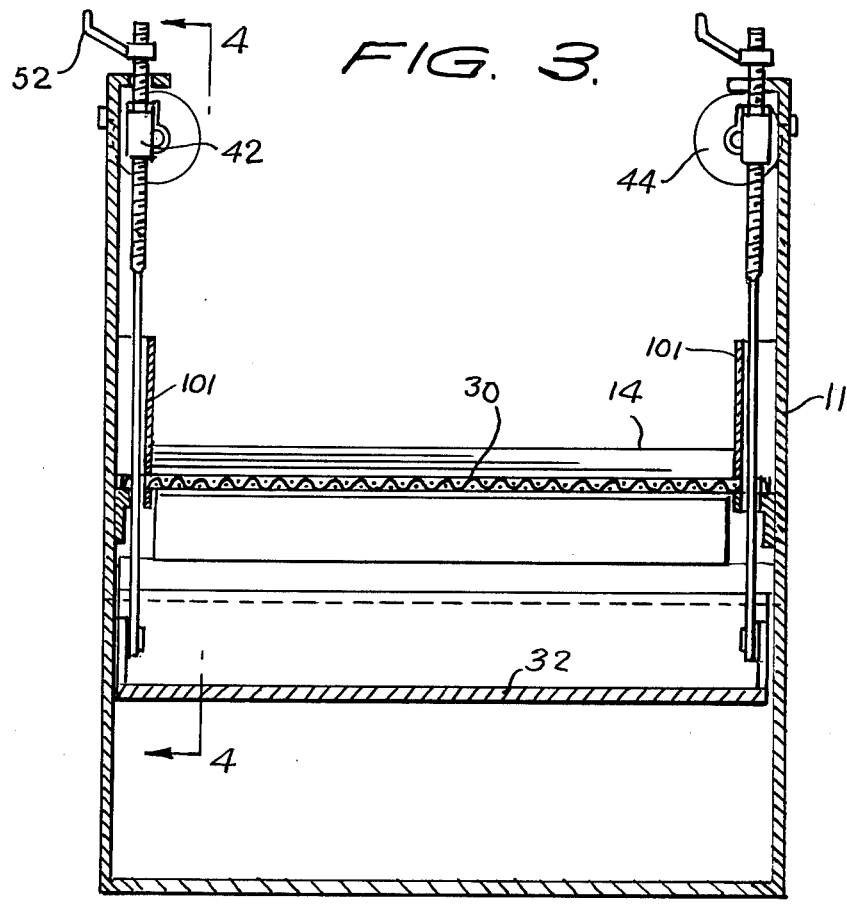
FIG. 3 is a sectional view taken on line 3—3 of FIG. 2.
Figure 4:
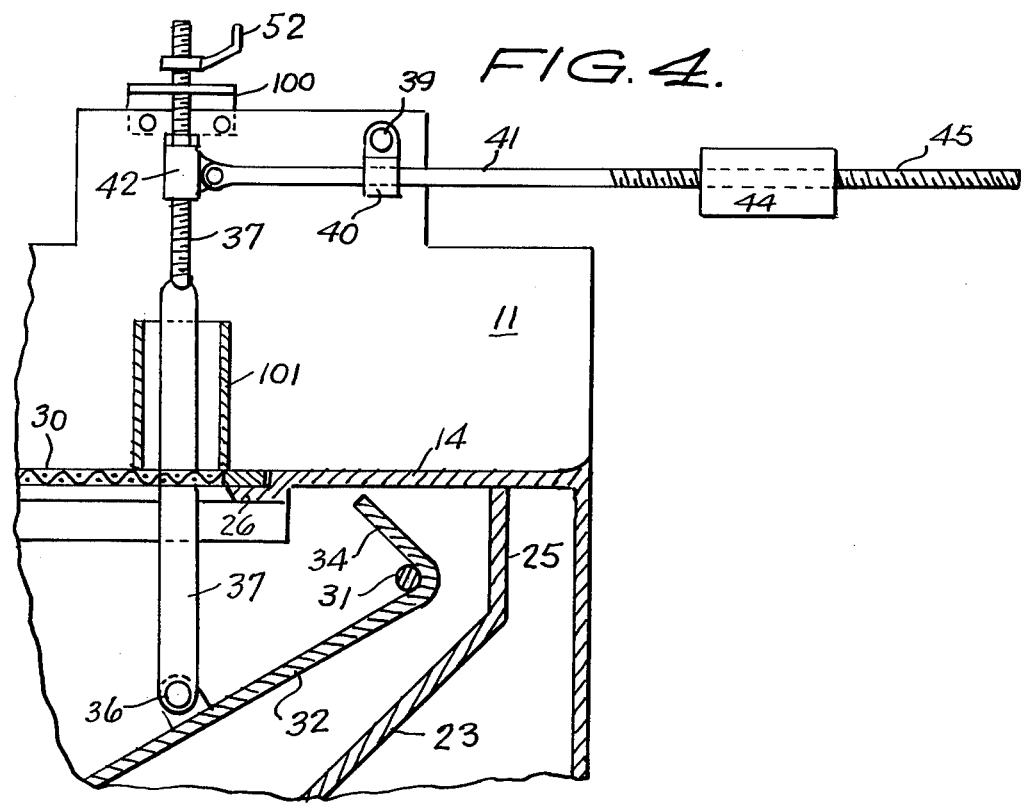
FIG. 4 is a sectional view taken on the line 4—4 of FIG. 3.

Referring in detail to the drawings, the numeral 10 indicates a supporting structure which includes a fluid inlet end and an outlet end. The supporting structure 10 includes a pair of spaced parallel vertically disposed side walls 11. Arranged contiguous to the fluid inlet end is a horizontally disposed platform 12 which extends between the side walls 11 and which is secured thereto in any suitable manner. The numeral 13 indicates the water and trash which enter the inlet end of the device 10. The numeral 14 indicates a horizontally disposed shelf which is arranged adjacent the outlet end of the device, and the shelf 14 extends between the walls 11 and is secured thereto. The numeral 15 indicates the trash which leaves the device, and this trash 15 can be conveyed to any suitable locality.

Arranged on the side of the lower portion of the supporting structure 10 is a hollow tube 16, and as shown in FIG. 1 the numeral 17 indicates an outlet end of the tube 16, and the clean filtered water is adapted to pass out the outlet end 17 to any suitable location as for example when this water is to be used for irrigating purposes.

The numeral 18 designates a vertically disposed pipe which extends upwardly from the tube 16. The tube 16 is further provided with an enlarged or elongated opening 19, FIG. 2.

The numeral 21 indicates an inclined base which has one end mounted below the platform 12, and the other end portion of the base 21 is supported on the flange 20. The base 21 has on its upper portion a plurality of spaced apart agitators 22 for a purpose to be later described.

There is further provided a wall member which is indicated generally by the numeral 23, and the wall member 23 includes an inclined portion 24 which extends from flange 20 and which is secured thereto in any suitable manner, as for example by welding, and the wall member 23 further includes an upper vertically disposed section which is secured to the lower portion of the shelf 14, and this section is shown in FIG. 2 and is indicated by the numeral 25.

The numeral 30 indicates a screen which is mounted within the frame 26, and the screen 30 functions as a filter so that trash or other foreign matter will be prevented from passing downwardly through the screen 30 while the water can pass through the screen.

Extending between the pair of side walls 11 and supported thereby is a horizontally disposed rod 31. The numeral 32 indicates a movable door which is pivotally or hingedly mounted on the rod 31, FIG. 2. The door 32 is mounted for movement towards and away from the lower end of the base 21, as for example as shown in FIG. 2. A stop shoulder 34 is connected to the door 32 for closing the door 32 at the top, the same time it closes at the lower end or base.

The door 32 is connected to screw members 37 through pins 36 on the inside of the vertical walls 11 and screw members 37 are provided with a shroud 101 which prevents debris from bypassing the screen and following the downward flow of water. The shrouds are fastened to the inner portions of walls 11.

The numeral 40 designates each of a pair of hanger members which are pivotally connected to the inner surface of the side walls 11 in any suitable manner, as for example by means of pivot pins 31. Shafts 41 extend through the hanger members 40, and a head 42 on an end of each shaft 41 is connected to each corresponding screw member 37. The numeral 44 indicates a counterweight which is arranged in threaded engagement with the threaded portion 45 of each shaft 41.

From the foregoing, it is apparent that there has been provided an apparatus which is especially suitable for use in filtering or removing trash, foreign matter, or debris from water, so that clean filtered water can be supplied for any desired purpose, as for example for irrigation purposes. According to the present invention the device is adapted to be arranged in such a manner that the inlet water and trash as indicated by the numeral 13 in FIG. 2 will flow from left to right in FIG. 2 from a suitable source of supply. As this water and trash pass between the side walls 11 and over the platform 12, it is to be noted that the trash will be collected on the screen 30 while some of the water can pass downwardly through the screen 30 and onto the base 21. The members 22 function as agitators so as to help stir up or agitate the water whereby the device will operate more efficiently. With the door 32 in the lowered position as indicated in solid lines in FIG. 2, it will be seen that a space is provided between the door 32 and lower end of the base 21 so that the clean filtered water can pass through the space between the door 32 and base 21 and this water can then pass down through the opening 19 and then through the tube 16 and out through the end 17 and this water from the end 17 can be conveyed or discharged to any desired locality. Meanwhile the debris or trash which accumulates on the screen 30 will be continually washed off of the screen so that this material as indicated by the numeral 15 will pass out through the right end of the device as shown in FIG. 2 and this trash 15 can be deposited or conveyed to any desired location.

The weight of the water on the door 32 serves to overcome the weight of the counterweight 44 so that depending upon the amount of water above the door 32, the door 33 will occupy a different position so that the device functions in an automatic manner to control the flow of water therefrom.

The pipes 18 function as air vents. The door or gate 32 is movably mounted by means of the connection with the rod 31. The parts can be made of any suitable material and in different shapes or sizes. The agitators 22 serve to induce a type of boiling or stirring up of the water so as to help keep the screen 30 swept clean of trash. The shelf 14 serves to support the frame 26 so that the screen 30 will be held in its proper position. Handle pieces 52 may be connected to the upper ends of the screw members 37 for manually limiting the opening or completely close the outlet door 32.

The top portion of screw members ride in a pair of flanges 100 which serve to retard vertical displacement of members 37 at desired point. To this end, these flanges are provided with cut away portions 104.

The present invention is adapted to be used for screening leaves, trash and gravel from water and it is not a sediment settling or water measuring device. The device is controlled automatically by the amount of water flowing into it, the amount being regulated to the amount of water necessary to carry away the trash. As the water varies in quantity, the device opens or closes the outlet gate 32 under the screen so as to maintain approximately the same percentage of water out the trash overflow. In other words most of the water passes out through the tube 16, but some of the water is used for carrying away or sweeping off the trash 15 from the top of the screen 30 so that the screen will be kept clean. Thus, by keeping a small amount of water flowing out the trash overflow, the trash will be carried away so that the screen will not become clogged. If water is allowed to drop straight through a screen, the trash collects on the screen so as to cause all of the water to flow over the top of the trash sealed screen.

Thus, it will be seen that there has been provided a device which will serve to remove leaves, trash, and gravel from flowing water and the device is controlled automatically by the amount of water flowing into it. The base 21 and wall member 23 serve to completely close the bottom of the device except for the discharge opening into the pipe or ditch. The water and trash pass over the platform 12, and the agitator 22 serves to agitate the water so as to help clear the screen and avoid clogging. The pressure of flowing water to and through the screen, for the purpose of keeping sufficient water to keep the trash moving, is controlled by the balance shaft 41 which in turn regulates the outlet door 32. The balance members 44 serve to open or close the outlet door 32 under the screen so as to maintain the proper portion of water to carry the trash overflow.

If desired, the outlet can be manually controlled, and different types of weights can be used for controlling the amount of water passing through the outlet. The size of the screens can be varied as desired, and hydraulic or electric actuating devices can be used when desired or required.

By providing the screw members 37 inside the walls 11, the need for a double walled construction is eliminated and walls 11 may be formed from thinner stock. The pivot bar 31 terminates at the walls 11 and ride in bearings disposed in the walls which have gaskets to retard water seepage at that point.

Minor changes in shape, size and rearrangement of details coming within the field of invention claimed may be resorted to in actual practice, if desired.

What is claimed is:

1. An improved balance control water screen wherein the improvement comprises a pair of shrouds each of which are disposed on the inner faces of opposed vertical walls, screw members riding within said shrouds, said screw members being provided with flange members at their top extent to retard vertical displacement at any desired point, said screw members are connected to a door remote from said flanges and said door is pivotally disposed about a rod which is mounted through water retarding bearings on said vertical walls.

* * * * *